(12) United States Patent
Bartolomucci et al.

(10) Patent No.: US 9,790,335 B2
(45) Date of Patent: Oct. 17, 2017

(54) BIO-DERIVED POLYMERS HAVING IMPROVED PROCESSABILITY AND METHOD FOR THE PRODUCTION THEREOF

(75) Inventors: John R. Bartolomucci, Montoursville, PA (US); Song Cheng, Ellicott City, MD (US)

(73) Assignee: Pennsylvania College of Technology, Williamsport, PA (US)

( * ) Notice: Subject to any disclaimer, the term of this patent is extended or adjusted under 35 U.S.C. 154(b) by 1154 days.

(21) Appl. No.: 14/237,989

(22) PCT Filed: May 13, 2011

(86) PCT No.: PCT/US2011/036374
§ 371 (c)(1),
(2), (4) Date: Feb. 10, 2014

(87) PCT Pub. No.: WO2011/143519
PCT Pub. Date: Nov. 17, 2011

(65) Prior Publication Data
US 2014/0206790 A1    Jul. 24, 2014

Related U.S. Application Data

(60) Provisional application No. 61/334,215, filed on May 13, 2010.

(51) Int. Cl.
| | | |
|---|---|---|
| *C08G 63/91* | (2006.01) |
| *C08J 3/28* | (2006.01) |
| *C08J 5/18* | (2006.01) |
| *C08K 5/00* | (2006.01) |
| *C08K 5/3492* | (2006.01) |
| *C08K 5/103* | (2006.01) |

(52) U.S. Cl.
CPC .............. *C08J 3/28* (2013.01); *C08G 63/912* (2013.01); *C08J 5/18* (2013.01); *C08K 5/0025* (2013.01); *C08K 5/34924* (2013.01); *C08J 2300/16* (2013.01); *C08J 2367/04* (2013.01); *C08K 5/103* (2013.01)

(58) Field of Classification Search
CPC ... C08J 3/28; C08J 5/18; C08J 2300/16; C08J 2367/04; C08G 63/912; C08K 5/0025; C08K 5/34624; C08K 5/103
See application file for complete search history.

(56) References Cited

U.S. PATENT DOCUMENTS

| | | |
|---|---|---|
| 2002/0136848 A1 | 9/2002 | Yoshii et al. |
| 2005/0032923 A1 | 2/2005 | Oka et al. |
| 2005/0143502 A1 | 6/2005 | Yamada et al. |
| 2006/0047026 A1 | 3/2006 | Yamada et al. |
| 2006/0286383 A1 | 12/2006 | Gilmer |
| 2008/0045654 A1 | 2/2008 | Richard et al. |
| 2008/0213209 A1* | 9/2008 | Kanazawa ................. C08J 3/24 424/78.31 |

\* cited by examiner

*Primary Examiner* — Michael Pepitone
(74) *Attorney, Agent, or Firm* — The Webb Law Firm (57) ABSTRACT

Provided are modified bio-derived polymers having improved processability as well as methods of producing such polymers and articles produced therefrom. The modified bio-derived polymers have improved melt strength compared with presently available bio-derived polymers. Thus, the inventive bio-derived polymers are suitable for use in plastic processing techniques such as blow molding and blown film extrusion.

9 Claims, 8 Drawing Sheets

NatureWorks, LLC.
Certificate of Analysis

Certificate: 06132008 17765 2036131
Date: 6/13/2008

FORD STORAGE AND MOVING CO INC
FOR ACCT OF JAMPLAST INC
7402 L ST
OMAHA, NE 68127-1852
UNITED STATES

Cust P.O.: 12342                    Order No.: 3019970-1
                                     Load No.:  17765-1

Material:      NATUREWORKS** 2002D 750KG POLYLACTIDE RESIN
Batch:         WD1728B111
Weight (LBs):  9,920.803             Weight (KGs):  4,500.000
Vehicle:       CPU 9999
Ship from:     NATUREWORKS LLC       LA VISTA
L/C Number:                          NE This material meets requirements of the specification.

| Feature | Units | Results | Minimum | Maximum |
|---|---|---|---|---|
| D Isomer | % | 4.3 | 3.7 | 4.8 |
| Relative Viscosity | --- | 3.96 | 3.90 | 4.10 |
| Color, Yellowness Index | --- | 30.1 | --- | 35.0 |
| Residual Monomer | % | 0.13 | --- | 0.30 |

BIO-DERIVED POLYMERS HAVING IMPROVED PROCESSABILITY AND METHOD FOR THE PRODUCTION THEREOF

CROSS REFERENCE TO RELATED APPLICATIONS

This application claims priority to U.S. Provisional Patent Application No. 61/334,215 filed on May 13, 2010, the entire contents of which are incorporated herein by reference.

BACKGROUND OF THE INVENTION

Field of the Invention

This invention relates to modified bio-derived polymers having improved process ability, and particularly improved melt strength, compared with currently available bio-derived polymers as well as methods of producing such polymers and articles produced therefrom. The polymers described herein are suitable for use in plastic processing techniques which require higher melt strength, including, but not limited to, extrusion blow molding, and blown film extrusion processing.

Description of Related Art

Bio-derived polymers are polymers that are made from renewable resources. Bio-derived polymers may be both biodegradable and biocompostable. Polylactic acid (PLA) is one such example of a bio-derived polymer that is both biodegradable and biocompostable, and it is made commercially by several companies from corn and other types of renewable resources. Because they are made from bio-renewable agricultural resources, manufacture of bio-derived polymers does not depend on depleting natural gas and oil resources for monomer feedstock. Potential market applications for these materials include biodegradable plastic bottles, packaging, disposable drink cups, plastic straws, and many other articles that are traditionally manufactured from polyethylenes, polypropylenes, polystyrenes, polyvinyl chlorides, as well as other plastics. Replacement of such traditional plastics used in these types of products with bio-derived polymers provides advantages of biodegradability, and lower carbon footprint for increased sustainability. While each of these traditional plastic materials may take tens to hundreds of years to degrade, PLA and certain other bio-derived polymers offer a much greater rate of biodegradation which generally can occur within a period of several months.

Most of the articles currently made from bio-derived polymers such as PLA are made by one or more of the major high-volume plastic processes such as fiber, film, profile or sheet extrusion, and primarily injection molding, for which the melt strength of PLA is suitable. PLA, as with many other bio-derived polymers, has not been found useful or suitable for use in plastic processes that require higher melt strength than that required for injection molding or extrusion, such as extrusion blow molding and blown film processes, both of which rely on and require the formation of a high melt strength extruded tube or parison to shape the article. Generally, the extrusion blow molding and blown film extrusion processes require use of high melt strength materials in order to maintain the parison in a highly viscous or leather-like state without undergoing too much sagging. PLA, as well as many other bio-derived polymers, are inherently low melt strength polymers, rendering them inappropriate for use in at least the extrusion blow molding and blown film processes since a parison created from these materials will usually collapse upon itself preventing formation of blown products therefrom.

SUMMARY OF THE INVENTION

The present invention is primarily directed to modified bio-derived polymers having improved processability and methods of producing such polymers as well as articles produced therefrom. The modified bio-derived polymers have improved melt strength compared with presently available bio-derived polymers. Thus, the inventive bio-derived polymers are more suitable for use in plastic processing techniques such as extrusion blow molding and blown film extrusion.

In one non-limiting embodiment, provided is a modified bio-derived polymer. The polymer is produced by blending a polymer base material comprising at least one bio-derived polymer, such as polylactic acid, and a promoter which can promote long chain branching or partial crosslinking of the polymer and subsequently irradiating the blended composition. The promoter may be present in amounts such as about 0.2 wt % to 5.0 wt % based on the total weight of the polymer base material. The irradiation may be by, for example, electron beam (e-beam), gamma, X-ray, or other energy forms such as UV radiation. For e-beam radiation, the irradiation dosage may be, for example, from about 5 kGy to about 40 kGy.

In another non-limiting embodiment, provided is a method of producing a modified bio-derived polymer. The method includes a step of blending a polymer base material comprising at least one bio-derived polymer with a promoter. The method further includes a step of irradiating the blend to promote long chain branching or partial crosslinking without developing excessive gel formation in the polymer network.

In another non-limiting embodiment, provided is an article produced from the modified bio-derived polymers described herein, such as a product produced through a blow molding or extruded blown film process.

These and other features and characteristics of the invention will become more apparent upon consideration of the following description.

DESCRIPTION OF THE PREFERRED EMBODIMENTS

Other than in the operating examples, or where otherwise indicated, all numbers expressing quantities of ingredients, process conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements. Furthermore, when numerical ranges of varying scope are set forth herein, it is contemplated that any combination of these values inclusive of the recited values may be used. Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

Provided are modified bio-derived polymers having improved processability, and particularly improved melt strength, as well as methods of preparing such polymers. The modified bio-derived polymers of the present invention are formed by blending a polymer base material comprising at least one bio-derived polymer with a promoter which can promote long chain branching or partial crosslinking of the polymer and subjecting the blended composition to dose-controlled radiation to provide the desired level of long chain branching or partial crosslinking within the polymer network while avoiding processability-limiting levels of gel formation. The radiation dosage and amount of promoter is controlled to provide a modified bio-derived polymer that can be processed into a shaped article according to processes that typically require high melt strength, such as extrusion blow molding and blown film processes.

Bio-derived polymers include polymers that are wholly or partially derived from or synthesized by renewable biomass sources, such as renewable plants, forestry, bacterial, or animal feedstock. Such polymers may also be known as "bioplastics." In addition to being derived from renewable resources, certain of these polymers may also be biodegradable, having the added advantage of generally degrading at a much faster rate than polymers that are entirely petroleum-based. Non-limiting examples of bio-derived and/or biodegradable polymers include polylactic acid (PLA), polycaprolactone (PCL), polybutylene succinate (PBS), bio-derived polyethylene, poly-3-hydroxybutyrate (PHB), bioderived polyurethanes, bioderived polyethylene terephthalates, polyglycolide (PGA), polyhydroxyalkanote (PHA), timethylene carbonate, and blends and/or copolymers thereof. Such polymers are commercially available from a variety of manufacturers. NatureWorks LLC of Minnetonka, Minn. is one commercial supplier of PLA. PLA is an example of a polymer that is both bio-derived and/or biodegradable. However, most, if not all, of these commercially available bio-derived polymers lack sufficient melt strength for processing through, for example, blow molding or extrusion blown film.

The modified bio-derived polymers of the present invention are prepared from a polymer base material. The polymer base material may comprise an "unmodified" bio-derived polymer, such as those described above, which do not have the improved melt strength of the modified bio-derived polymers of the present invention. The polymer base material may also consist of or consist essentially of one or more of these bio-derived polymers. In some non-limiting embodiments, the polymer base material may include mixtures of more than one bio-derived polymer or may include one or more bio-derived polymer in combination with one or more traditional, petroleum-based polymer.

The novel bio-derived polymers of the present invention also include one or more promoter compounds useful in promoting long chain branching or partial crosslinking of the polymer network. Promoters for use in the invention include certain known promoters that are suitable for radiation crosslinking of polymers. Many such promoters are known in the art. Non-limiting examples of potentially useful promoters include triallyl cyanurate, triallyl isocyanurate (TAIC), trimethylolpropane triacrylate (TMPTA), trimethylolpropane trimethylacrylate, pentaerythritol tetraacrylate, tetramethylol tetraacrylate, ethylene glycol dimethacrylate, and other di, tri-, and multi-functional promoters whether derived from non-renewable or renewable feedstocks as well as combinations thereof.

The amount of promoter useful in the invention depends, at least in part, on the radiation dosage, the particular polymer or polymers, the type of chemical promoter, and particular properties of the polymer composition desired, as will be described more fully below. Typical promoter content ranges from about 0.2 wt % to about 5.0 wt % based on the total weight of the polymer base material, such as between about 1.0 wt % and 3.0 wt %.

In addition to the polymer base material and the promoter, other additives, such as dyes, pigments, fillers, stabilizers, impact modifiers, reinforcements, etc. can be used in preparing the modified bio-derived polymers of the present invention. The selection of such additives would be appreciated by one skilled in the art.

For example, as some bio-derived polymers, such as PLA, are inherently brittle, it may be beneficial to include additives that can increase the impact resistance. One non-limiting manner of improving the impact resistance may be through the addition of styrene-ethylene/butylene styrene block copolymers (SEBS) having maleic anhydride grafted onto the ethylene/butylene rubber midblock. A developmental SEBS product is available from Kraton FG. It has been found that the addition of SEBS in an amount of 5 wt % can approximately double the unnotched Izod impact resistance of non-irradiated PLA base polymer.

Given that irradiation and the resulting slight or partial crosslinking may increase the time which it takes the bio-derived polymers to biodegrade, additives for enhancing the biodegradation rate may be included. As one non-limiting example, it is envisioned that particulate clays, and preferably nanoparticulate clays, may be incorporated into the bio-derived polymers to improve strength and accelerate biodegradation rates. Such clays may be incorporated into the base polymer at the time of compounding with the promoter (prior to irradiation).

The promoter and the polymer base material, as well as any optional fillers, can be blended together to form a homogenous or near homogenous mixture according to known methods of plastics processing. For example, blending can be accomplished using a twin screw extruder. The blend can then be pelletized or similarly formed to make it easier for handling, storage, and subsequent exposure to irradiation.

Once the promoter and polymer base material are blended together, the resultant blend can be exposed to a dosage of irradiation to promote long chain branching or partial crosslinking within the polymer network. Some preferred types of irradiation include electron beam (e-beam), gamma, and X-ray radiation. The type of promoter used may depend on at least the type of irradiation used, and more particularly the responsiveness of the particular promoter to the various irradiation types.

Long chain branching, partial crosslinking, or gel formation may occur in the polymer network upon irradiation in the presence of the promoter. Gel formation can be said to be the result of more complete, or even total, crosslinking within the polymer network. The extent of gel formation can be detected by regular gel content tests or gel screening tests known to those skilled in the art. Once a certain amount of gel formation has occurred in a polymer, the ability to further process that polymer using certain applications may become difficult or even impossible. Thus, in creating a bio-derived polymer having improved processability, the content of the promoter and irradiation dose level should be controlled in order to control the level of long chain branching and crosslinking and the polymer properties associated therewith. If the combination of the promoter content and the irradiation dose is too low, there would not be a sufficient level of long chain branching or partial crosslinking and, consequently, a polymer having inadequate melt strength. On the other hand, if the combination of the promoter content and irradiation dose is too high, the polymer would have excessive gel formation, resulting in a polymer having a greatly reduced melt flow rate that cannot be easily processed or processed at all. In these instances, the polymer would be said to be too gelled for processing into a useful article through a blow molding or blown film process. However, it should be noted that formation of microgels, which cannot typically be detected using traditional gel content tests, may occur to some degree without detrimentally affecting the processability of the bio-derived polymers.

For purposes of this invention, typical irradiation dosages range from 2 kGy to 50 kGy or more with dosages greater than 5 kGy but less than 40 kGy being preferred in order to allow for sufficient long chain branching or partial crosslinking while preventing or limiting the degree of gel formation. In some non-limiting embodiments, it has been found that pairing a promoter in an amount of between about 1 wt % and about 3.0 wt % based on the total weight of the polymer base material with an irradiation dose (and preferably e-beam irradiation) of between about 10 kGy and about 40 kGy can provide a modified bio-derived polymer with a level of partial crosslinking or long chain branching wherein the melt flow rate, melt strength, and other properties are desirable for use in creating articles through extrusion blow molding and blown film processes.

A few examples of articles that can be produced from these modified bio-derived and/or biodegradable polymers in high volume extrusion blow molding applications include plastic bottles, containers, and other hollow objects that are currently made from high density polyethylene and other high volume polymers such as polypropylenes, polystyrenes, polyvinyl chlorides, as well as other plastics. Examples of blown film extrusion articles include biaxially oriented film for plastic bag and plastic film applications offering better strength and permeability characteristics than film made using cast film extrusion dies. Many of the traditional plastic container and packaging materials are disposable products, do not biodegrade, and are currently made from non-renewable resources.

The production process described above may similarly apply to improvement of the melt strength of non bio-derived polymers for plastics processes requiring higher melt strength materials such as, but not limited to, extrusion blow molding and blown film extrusion processes.

The various components of the polymer composition may be mixed together batch-wise and then subjected to irradiation also in a batch-wise process. Another non-limiting alternative would be a more continuous process whereby the promoter and any additives can be added to the bio-derived polymer base material near or at the end of the polymerization process while the polymer is still in the liquid state. The composition can then continue along the continuous process, such as on a conveyer or like apparatus, to an irradiation station where it can be subjected to the appropriate type and amount of irradiation.

While not wishing to be bound to a single theory, it is believed that radiation on bio-derived polymers results in the breakdown or scission of the polymer chains, which in the absence of a long chain promoter such as TMPTA and other di, tri, and polyfunctional monomeric promoters or mixtures of, leads to reduction in polymer molecular weight, a broadened molecular weight distribution, an increase in rheological flow characteristics, that is lower melt viscosity, as well as a reduction in the polymer's melt strength. The degree of such changes may generally depend on the type of polymer and the amount of irradiation. Effects such as those mentioned are generally seen as unfavorable and as evidence of polymer degradation. Given, however, the presence of a suitable promoter during the irradiation process, suitable meaning the type and amount as regards the ability to react with the chemical constitution of specific polymer at the time of irradiation, it is thought that the promoter can mitigate, and even overcome, the undesirable effects of irradiation in large degree by achieving a balance between chain scission and long chain branching. In particular, such competition between chain scission and reassembly favors or enables molecular reassembly via long chain formation leading to an observed increase in melt strength and ability to process the resultant polymer which is perhaps not otherwise processable in plastic material processes that require the polymer to have a sufficiently high melt strength such as the extrusion blow molding process.

The following examples are illustrative of the various embodiments of the present invention and should not be construed as being limiting.

EXAMPLES

Figure 6:
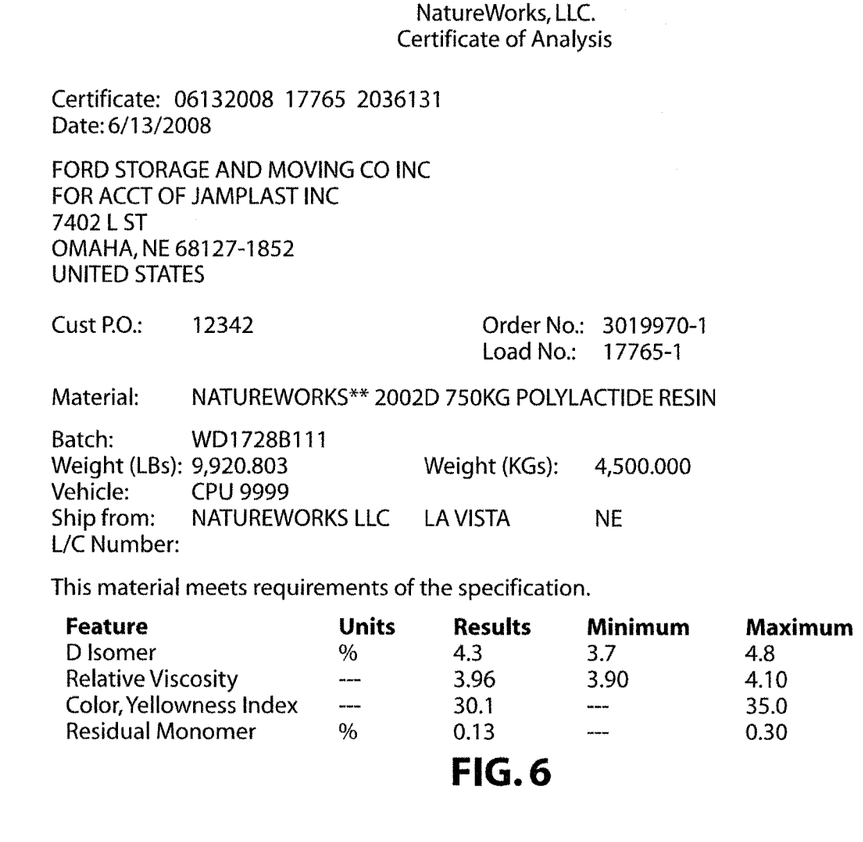
FIG. 6 is a copy of the certificate of analysis for the PLA material utilized in the Examples to achieve a bio-derived polymer having improved processability.

A collection of samples were prepared by blending polylactic acid (PLA) supplied by NatureWorks LLC under the product name "NatureWorks PLA Polymer 2002D" and a promoter. The PLA was supplied by Jamplast Incorporated, an authorized distributor for NatureWorks PLA 2002D polymer. The supplied PLA was under NatureWorks Certificate of Analysis 06132008. FIG. 6 is a copy of the Certificate of Analysis of the PLA material. The promoters tested were triallyl isocyanurate (TAIL, 98%) and trimethylolpropane triacrylate (TMPTA, technical grade). Compounding of the promoter into the PLA material was accomplished at Pennsylvania College of Technology using a co-rotating Leistritz 27 mm twin screw extruder running at 186 rpm and a 211° C. melt temperature. The PLA material was fed to the twin screw feed zone using a calibrated K-tron feeder. The liquid promoter was added simultaneously to the feed zone via a drip tube using a Sherwood Kangaroo calibrated medical IV metering pump. A three-strand die was used at the end of the compounder to produce approximately ⅛ inch diameter strands which were water cooled and fed into a strand pelletizer to produce the PLA/promoter blend in pellet form. The pelletized PLA compositions were next dried to a moisture content of less than 250 ppm, packaged in aluminum foil lined plastic bags, and sent to the San Diego, Calif. facility of Sterigenics International for e-beam irradiation processing. The identity and amount of the promoter as well as the e-beam irradiation dosage amount for the various samples is summarized in Table 1 below:

TABLE 1

| Sample | Promoter | Promoter amount (wt %) | Radiation dosage (kGy)* | Weight of the PLA/promoter blend treated, (lbs) |
|---|---|---|---|---|
| 1 | TAIC | 1 | 10 | 5 |
| 2 | TMPTA | 1 | 10 | 15.4 |
| 3 | TMPTA | 1 | 20 | 15 |
| 4 | TMPTA | 1 | 40 | 5 |
| 5 | TMPTA | 3 | 10 | 5 |
| 6 | TMPTA | 3 | 20 | 5.6 |
| 7 | TMPTA | 3 | 40 | 5.1 |

*DUR (Dose Uniformity Ratio) = max./min. ~1.2 to 1.5.

After e-beam irradiation treatment by Sterigenics International, the samples were returned to Pennsylvania College of Technology for further evaluation and processing. In particular, the various samples were evaluated for melt flow rate, extrudate appearance, and shear viscosity. A capillary rheometer was used to develop viscosity versus shear rate data on the Sample compositions. Melt flow rate, also known as melt index or melt flow index, was measured according to ASTM D1238-04 at 210° C. and 2.16 kg while high load melt flow rate was measured at 210° C. and 21.6 kg. The initial evaluation results on the samples are summarized in Table 2, below:

TABLE 2

| Sample | Melt flow rate (g/10 min.) | High load melt flow rate (g/10 min.) | Extrusion Blow Molding Trials |
|---|---|---|---|
| 1 | 5.833 | | Did not trial |
| 2 | 6.720 | | Did not trial |
| 3 | 3.525 | | Able to extrude parison and form bottle and threads of PCT 4 oz. FGH bottle |
| 4 | 11.030 | | Did not trial |
| 5 | 1.010 | 41.245 | Able to extrude parison and form bottle and threads of PCT 4 oz. FGH bottle. Very highly gelled bottle appearance. |
| 6 | 1.559 | 65.490 | Did not trial |
| 7 | 0.000[1] | 24.465 | Did not trial |

[1] appeared fully crosslinked. Did not melt or flow.

Based on the capillary rheology and melt flow rate data, extrusion blow molded bottles were made using Samples 3 and 5 on a Hesta HS360 single head extrusion blow molding machine using a standard die head designed for running polyethylene and polypropylene thermoplastic materials. The blow molding machine settings are set forth in Table 3 below:

TABLE 3

| Barrel Temp. profile: | Feed, zone 1 | 178° C. |
|---|---|---|
| | Compression, zone 2 | 195° C. |
| | Metering, zone 3 | 199° C. |
| | Head | 210° C. |
| Parison hot knife: | On, setting #2 | |
| Machine Delay settings: | Screw extrusion time | 9.5 sec. |
| | Knife cut delay | 0.1 sec. |
| | Platen transfer delay from parison to blow station | 0.4 sec. (final) 0.2 sec. (initial) |
| | Blow pin entry delay | 0.3 sec. |
| | Mold open delay | 0.2 sec. |
| | Platen/mold transfer from blow station to parison pick-up | 0.1 sec. |
| Machine screw RPM: | 48 (initial) Adjusted to provide required parison length | |
| Blow/cool time: | 9 sec. (initial) 7 sec. (final) | |
| Blow air pressure: | 80 psi | |
| Hunkar Parison programmer profile: | Channel 1 weight control setting | 50 |
| | Range setting | 5 |
| | Parison profile | Straight 30 |

Figure 1:
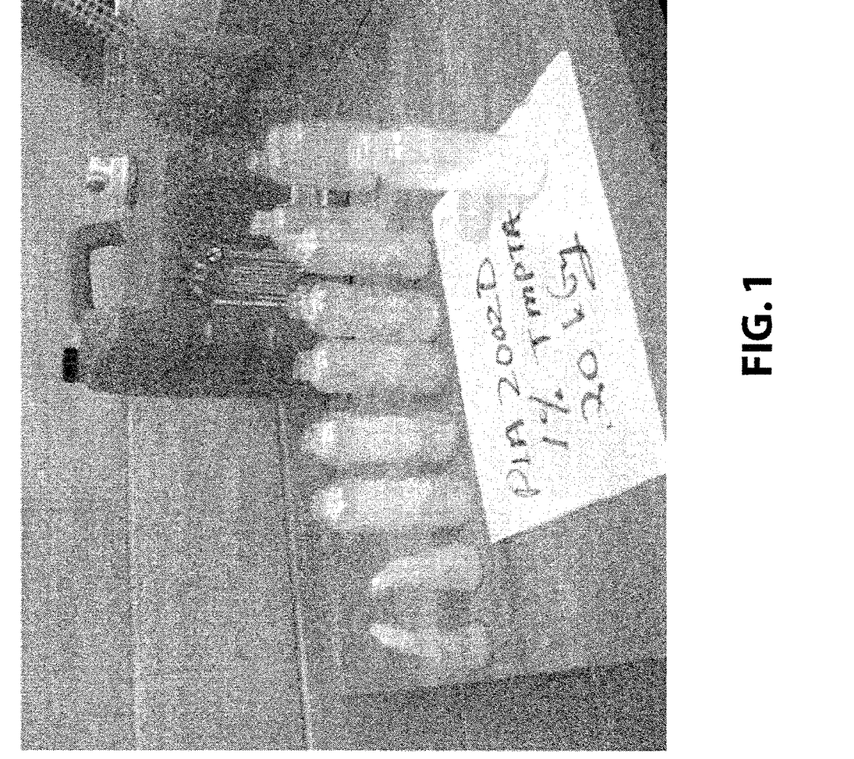
FIG. 1 is a photograph showing extrusion blow molded bottles made from a modified bio-derived polymer which is also biodegradable having improved processability according to the invention.
Figure 3:
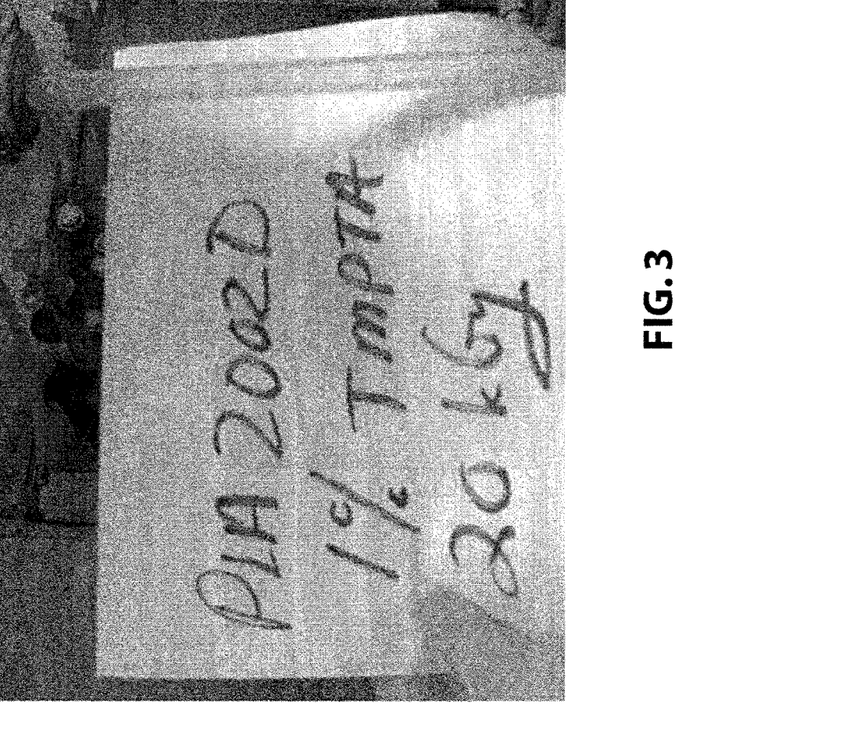
FIG. 3 is a photograph showing the parison produced using a modified bio-derived PLA polymer having improved processability according to the invention.
Figure 4:
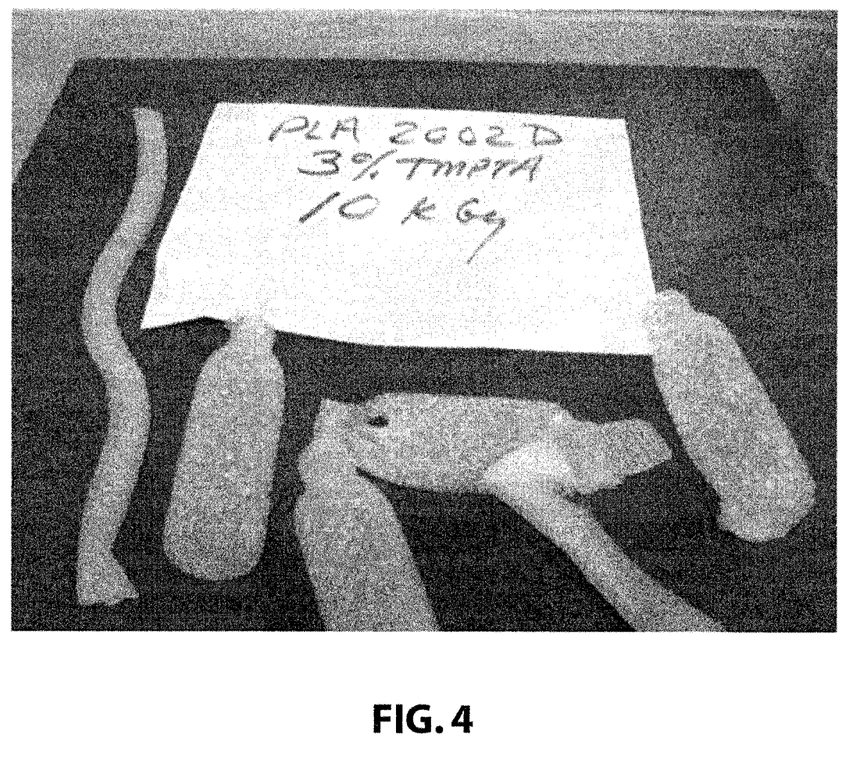
FIG. 4 is a photograph showing the parison and extrusion blow molded bottles produced from a bio-derived polymer having an excessive level of promoter and/or e-beam exposure dosage according to the invention. The bottles show signs of high gel formation.

FIG. 1 shows extrusion blow molded bottles produced from Sample 3, which contained 1 wt % TMPTA as a promoter and was subjected to an e-beam irradiation dosage of 20 kGy. FIG. 3 shows the extruded parison of Sample 3. The parison remains open during extrusion allowing a hollow melt tube or parison to be formed, enabling production of extrusion blow molded PLA bottles. FIG. 4 shows the parison and extrusion blow molded bottles produced from Sample 5. A visual observation of the parison and bottles shows higher gel content than in Sample 3.

Figure 5:
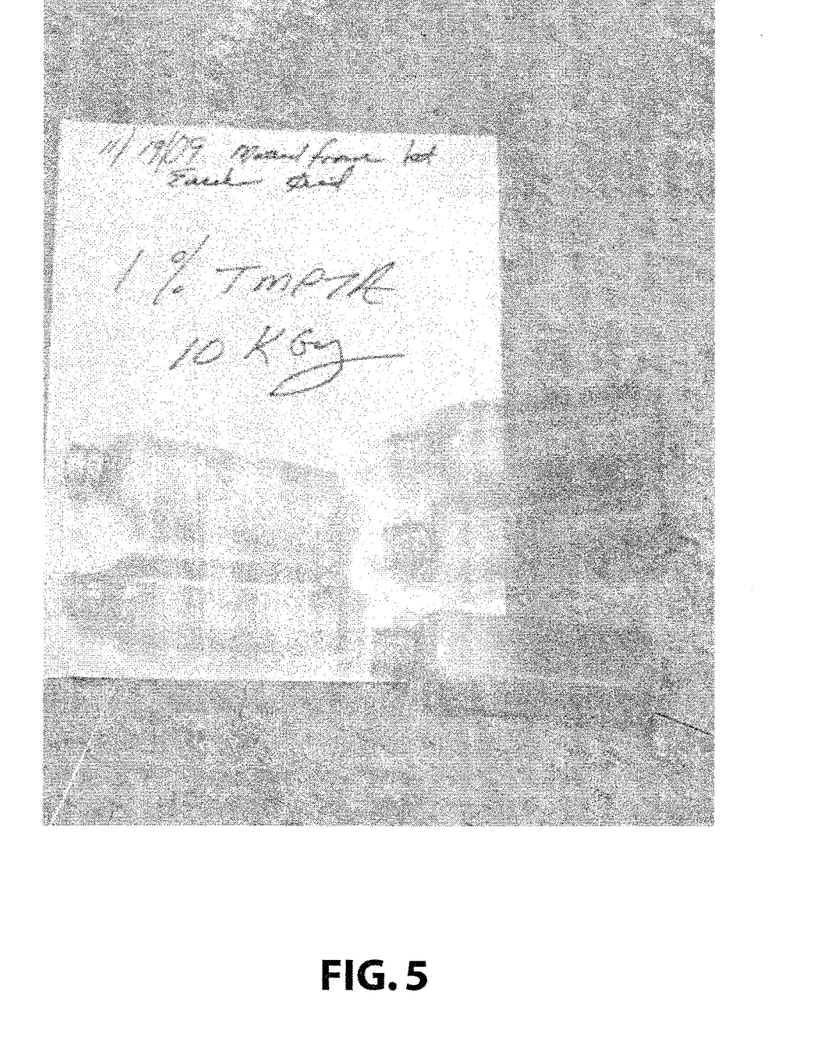
FIG. 5 is a photograph showing extrusion blow molded bottles made from a modified bio-derived polymer having improved processability according to the invention.

FIG. 5 shows extrusion blow molded bottles that were produced later from Sample 2 which, as shown in Table 1 above, contained 1 wt % TMPTA as a promoter and was subjected to an e-beam irradiation dosage of 10 kGy.

Figure 2:
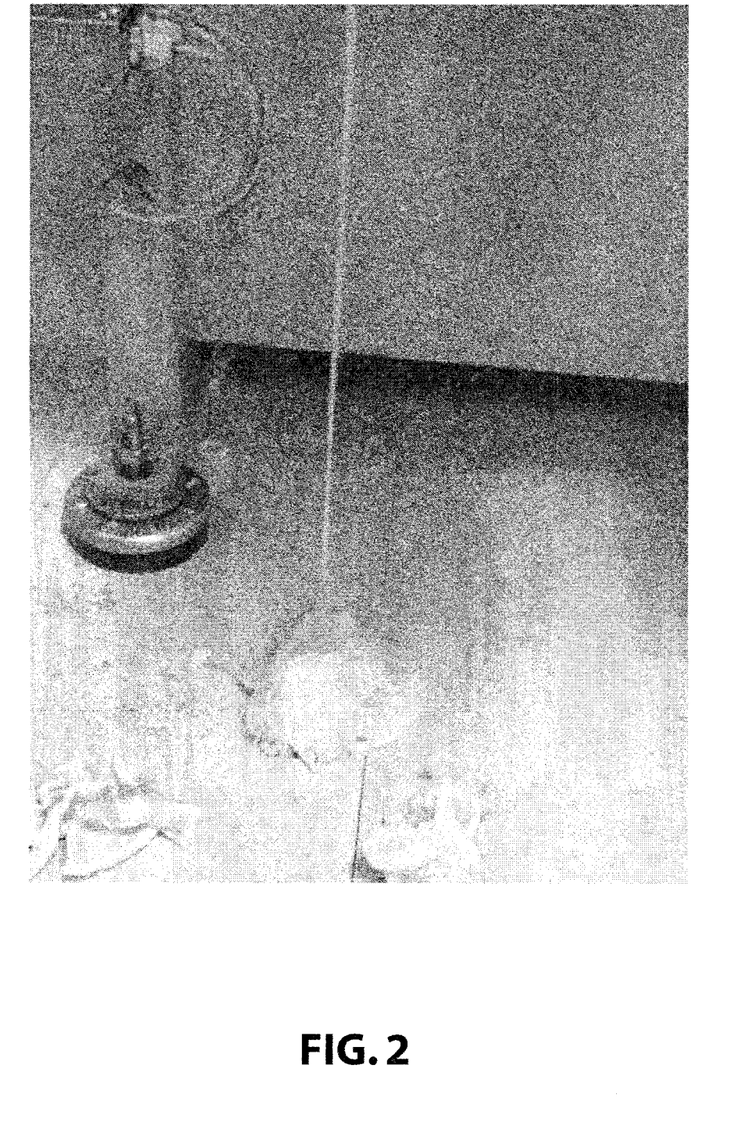
FIG. 2 is a photograph showing a failed attempt to produce an adequate parison using a control bio-derived and biodegradable polymer not having the improved processability of the polymers of the invention.

Also tested was a control sample consisting of the as-received NatureWorks PLA Polymer 2002D referenced above. FIG. 2 shows the extruded parison obtained with the control material that was dried to less than 250 ppm moisture content prior to melt processing. As seen in FIG. 2, the extruded parison produced from the dried control does not possess sufficient melt strength to support its own weight during extrusion blow molding, resulting in a solid strand of melt that progressively thins as the length and weight of the extruded parison increases. As is apparent, the failure of the control PLA polymer to produce an adequate parison shows that it is inadequate for use in blow molding or blown film applications.

A Malvern Instruments Rosand capillary rheometer equipped with a haul-off device was used to quantify the actual melt strength at 190° C. of two PLA 2002D materials, including Sample 3 from Table 1 above. Sample 3 contained 1 wt % TMPTA as a promoter and was subjected to an e-beam irradiation dosage of 20 kGy. The other PLA 2002D material was found to exhibit insufficient melt strength to form and sustain a parison suitable for extrusion blow molding the type of articles shown in FIG. 1 using the same Hesta HS360 EBM machine and process conditions shown in Table 3.

Figure 7:
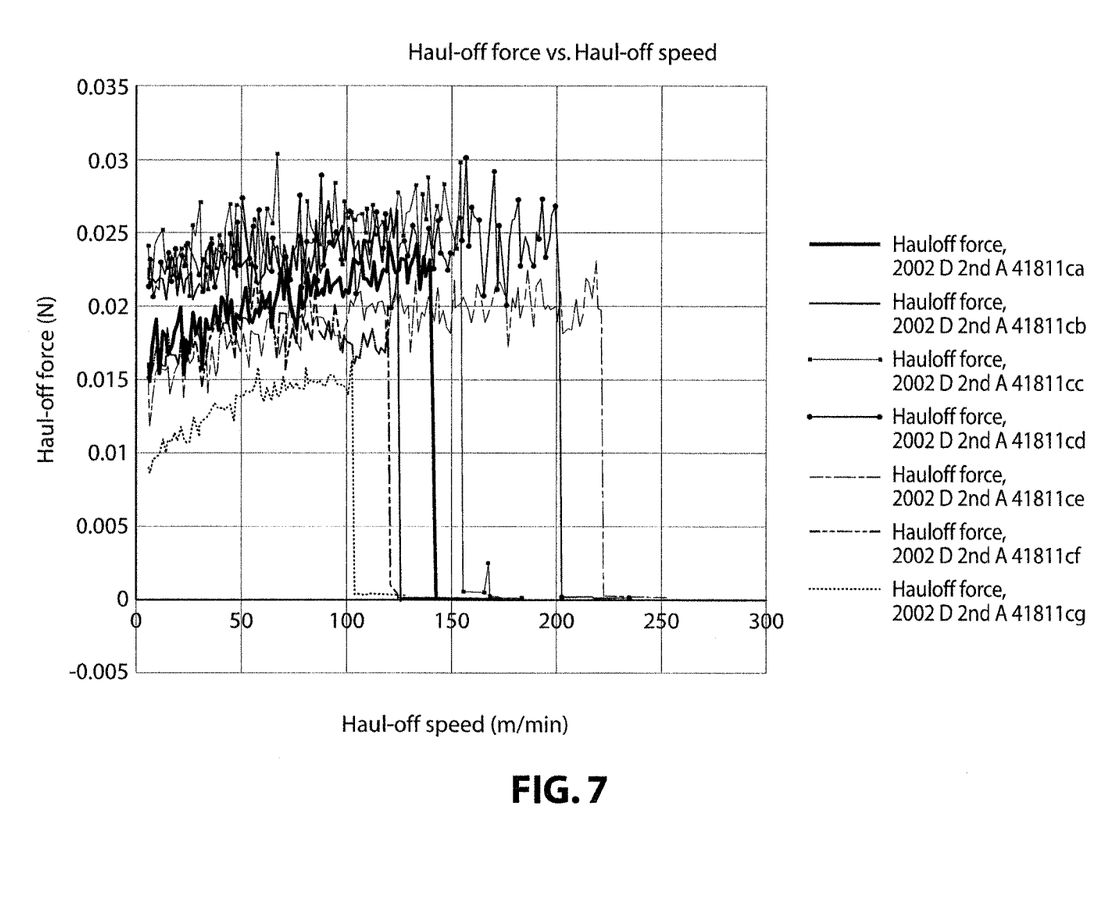
FIG. 7 is a graph showing the melt strength of a bio-derived and biodegradable polymer not having the improved processability of the polymers of the invention.
Figure 8:
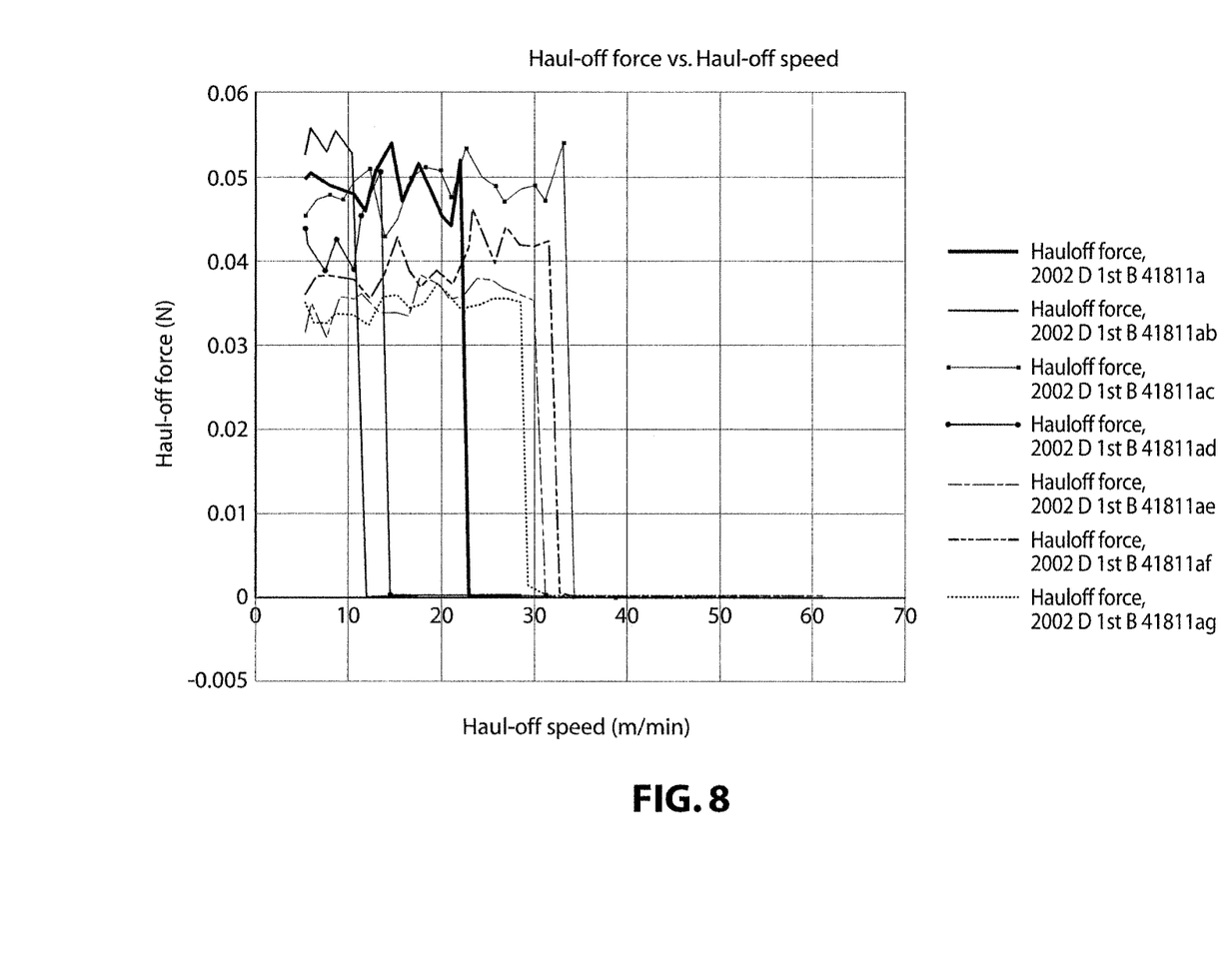
FIG. 8 is a graph showing the melt strength of a bio-derived and biodegradable polymer having the improved processability of the polymers of the invention.

FIG. 7 shows the melt strength force (N) versus haul-off speed (m/min) for the other PLA 2002D material. The maximum melt strength values for the seven runs on this PLA 2002D material ranged from 0.01628 N to 0.03303 N with an average value of 0.02531 N. FIG. 8 shows the melt strength results, obtained at a 190° C. melt temperature, on Sample 3 from Table 1 above which contained 1 wt % TMPTA as a promoter and was subjected to an e-beam irradiation dosage of 20 kGy. The maximum melt strength values for the seven runs on Sample 3 ranged from 0.037120 to 0.05400 N with an average value of 0.04796 N. The 0.04796 N average maximum value result on Sample 3 which contained 1 wt % TMPTA as a promoter and was subjected to an e-beam irradiation dosage of 20 kGy is approximately 90 percent greater than the average melt strength of the other PLA 2002D material.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

What is claimed is:

1. A method of producing a modified bio-derived polymer, comprising the steps of:
   blending a polymer base material comprising at least one bio-derived polymer and a promoter, wherein the promoter is present in an amount of between about 1.0 wt % and about 3.0 wt % based on the total weight of the polymer base material; and
   subjecting the blend to irradiation at a dosage range of between about 10 kGy and about 40 kGy, to produce a modified bio-derived polymer having a melt-strength and level of long chain branching and crosslinking sufficient for blow molding or blown film applications.

2. An extrusion blow molded thermoplastic article produced from a modified bio-derived polymer formed according to the steps of:
   blending a polymer base material comprising at least one bio-derived polymer and a promoter, wherein the promoter is present in an amount of between about 1.0 wt % and about 3.0 wt % based on the total weight of the polymer base material; and
   subjecting the blend to irradiation at a dosage range of between about 10 kGy and about 40 kGy.

3. An extruded blown film thermoplastic article produced from a modified bio-derived polymer formed according to the steps of:
   blending a polymer base material comprising at least one bio-derived polymer and a promoter, wherein the promoter is present in an amount of between about 1.0 wt % and about 3.0 wt % based on the total weight of the polymer base material; and
   subjecting the blend to irradiation at a dosage range of between about 10 kGy and about 40 kGy.

4. The extrusion blow molded article of claim 2, wherein the bio-derived polymer of the polymer base material is polylactic acid.

5. The extrusion blow molded article of claim 2, wherein the irradiation is selected from the group consisting of e-beam, gamma, X-ray, and UV radiation.

6. The extruded blown film article of claim 2, wherein the irradiation is selected from the group consisting of e-beam, gamma, X-ray, and UV radiation.

7. A method of producing an extrusion blow molded or extruded blown film article, comprising the steps of:
   blending a polymer base material comprising at least one bio-derived polymer and a promoter, wherein the promoter is present in an amount of between about 1.0 wt % and about 3.0 wt % based on the total weight of the polymer base material;
   subjecting the blend to irradiation at a dosage range of between about 10 kGy and about 40 kGy, to produce a modified bio-derived polymer having a melt-strength and level of long chain branching and crosslinking sufficient for blow molding or blown film applications; and
   forming an extrusion blow molded or extruded blown film article from the modified bio-derived polymer.

8. The method according to claim 1, wherein the promoter is present in an amount of about 1.0 wt % and the dosage is 10 kGy.

9. The method according to claim 7, wherein the promoter is present in an amount of about 1.0 wt % and the dosage is 10 kGy.

* * * * *

UNITED STATES PATENT AND TRADEMARK OFFICE
CERTIFICATE OF CORRECTION

PATENT NO. : 9,790,335 B2
APPLICATION NO. : 14/237989
DATED : October 17, 2017
INVENTOR(S) : John R. Bartolomucci et al.

It is certified that error appears in the above-identified patent and that said Letters Patent is hereby corrected as shown below:

Column 10, Line 28, Claim 6, delete "claim 2," and insert -- claim 3, --

Signed and Sealed this
Twenty-second Day of May, 2018

Andrei Iancu
*Director of the United States Patent and Trademark Office*